Figure 1:
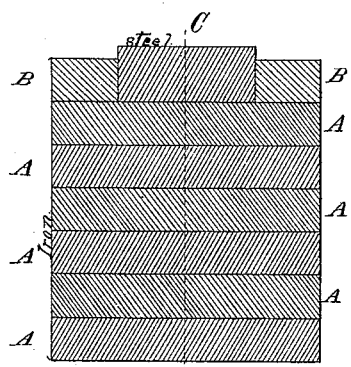

(No Model.)

A. KRAATZ.
PROCESS OF MAKING CUTTING BLADES.

No. 461,345. Patented Oct. 13, 1891.

WITNESSES
Arthur A. Erb.
C. S. Champion.

INVENTOR
August Kraatz.
by Frank L. Dyer
Attorney

UNITED STATES PATENT OFFICE.

AUGUST KRAATZ, OF BRIDGEPORT, OHIO.

PROCESS OF MAKING CUTTING-BLADES.

SPECIFICATION forming part of Letters Patent No. 461,345, dated October 13, 1891.

Application filed March 6, 1891. Serial No. 384,038. (No model.)

*To all whom it may concern:*

Be it known that I, AUGUST KRAATZ, a citizen of the United States, residing at Bridgeport, in the county of Belmont and State of Ohio, have invented certain new and useful Improvements in Processes of Making Cutting-Blades; and I do hereby declare the following to be a full, clear, and exact description of the invention, which will enable others skilled in the art to which it appertains to make and use the same.

My invention relates to various new and useful improvements in processes for making cutting-blades of various widths and lengths up to eight inches wide by twelve feet long, or longer if advisable, such as shears, heavy knives, &c.

By means of my improved process I am enabled to perform the operation of making cutting-blades in a much shorter time and more economically than by means of those processes which are at present in use; also, to procure a blade of any degree of temper required, which is difficult to do in other processes without the knives becoming warped or twisted; also, by means of my improved process there can be no liability of the quality of the steel becoming deteriorated by overheating, as is now the case.

Prior to my invention iron cutting-blades with steel cutting-edges have generally been made by first forging an iron bloom or pile to the desired length and width. This bloom or pile is then taken and a recess is planed or otherwise formed therein for the reception of the bar of steel which is placed therein. The iron and steel are then welded together in a forge, usually a "smith-forge" as it is known to the trade, either by hand or by means of a power hammer or drop. In carrying out such a process it is necessary to reheat the bloom or pile several times before the iron and steel are welded together. The principal objections to this well-known process are that the weld is often imperfect and that a great deal of time and labor are consumed in planing the groove and in forging the bloom or pile. By the use of my invention, which will now be described, all of these objections are overcome.

I first build up a "pile" of iron pieces or bars in such a manner as to leave a recess for the reception of the steel bar. In this way I overcome the necessity of planing a recess in the bloom, as in the old process. The various pieces or bars which compose the pile consist, preferably, of plates or layers of rerolled or puddled iron, which can be made very economically from many sources, such as from ordinary railroad-rails or otherwise. After the pile has been built up as I have just described it is placed in an ordinary heating-furnace of any approved construction, and it is then brought to a welding heat, which can be determined by any one skilled in the art to which my invention relates. While the iron pile is being heated in the furnace the steel is brought to a cherry-red heat in any convenient or usual manner. The two metals are now in the proper condition and of the proper heat for the application of the flux or welding compound, which is applied to the recess in the iron pile, and the steel bar in its heated condition is then immediately placed in position therein. The pile is now complete and is allowed to remain in the furnace until the color of the steel indicates that it has reached a proper welding temperature. The completed pile is now quickly withdrawn from the furnace and passed between suitable power-rolls, by which it will be reduced to the proper size and shape. In practice it has been found that the pressure of these power-rolls is sufficient to effect a thorough welding and combination between the iron and the steel.

My improved method of making cutting-blades by passing a pile through power-rolls is capable of being performed more economically and more cheaply than by hammering and heating as heretofore practiced, and by reason of the equality of pressure of the power-rolls the consequent welding is very uniform.

The various ways in which the pile is formed preparatory to being passed through the power-rolls are illustrated in the accompanying drawings, forming a part of this specification, and to which attention is now directed.

Figure 1 is a sectional view of a pile of such a construction as will allow two blades to be formed therefrom. A A are the iron plates or bars, laid one above the other. B B are two smaller iron bars, laid thereon so as to form a recess between them. C is the steel bar, which is placed in this recess. After this pile has been passed through the power-rolls it is to be slit in two, so as to form two blades. If desired, it will be understood that this pile may be divided before it is passed through the power-rolls.

Figure 2:
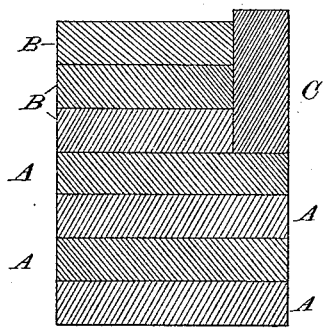

Fig. 2 is a sectional view of a pile from which a single blade is to be formed. A A are the iron blades or bars, having smaller iron plates or bars B B laid thereon so as to form a recess at one side, into which the steel bar C is placed.

Figure 3:
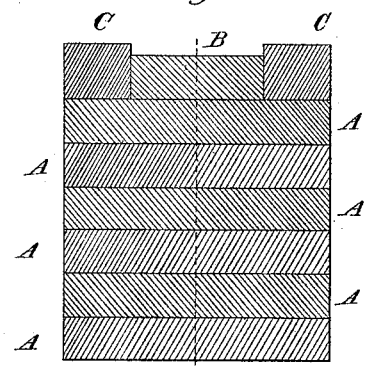

Fig. 3 is a sectional view of a pile from which is to be formed a blade having two cutting-edges. A A are iron plates or bars, laid one above the other, with a smaller iron bar B laid thereon so as to form recesses at each side. Into these recesses are placed the steel bars C C. It will be seen that when this pile has passed through the power-rolls a steel cutting-edge will be formed along each side. If desired, the blade may be used in this form, or it may be divided at the center, so as to form two cutting-blades.

It will be observed that in all the forms of piles the steel bar or bars project slightly beyond the iron portion of the pile. This is done in order that a greater pressure may be imposed upon the steel, in order that the resulting weld will be as perfect as possible.

Having now described my invention, what I claim as new therein, and desire to secure by Letters Patent, is as follows:

1. An improved process of making cutting-blades, which consists in first building up a pile of iron plates or layers so as to form a recess therein, then in heating said pile and simultaneously heating a steel bar, then in placing the steel bar within said recess, then in heating the complete pile, then in passing the completed pile through power-rolls, and then in splitting or cutting the pile longitudinally in two parts, for the purposes described, substantially as set forth.

2. An improved process of making cutting-blades, which consists in first building up a pile of iron layers or plates so as to form a recess therein, then in heating the pile and simultaneously heating a steel bar, then in applying a flux to said recess, then in placing the steel bar in said recess, then in reheating the complete pile, then in passing the complete pile through pressure-rolls, and then in splitting or cutting the pile longitudinally in two parts, for the purposes described, substantially as set forth.

AUGUST KRAATZ.

In presence of—
GEO. B. HATHEWAY,
B. M. CALDWELL.